UNITED STATES PATENT OFFICE.

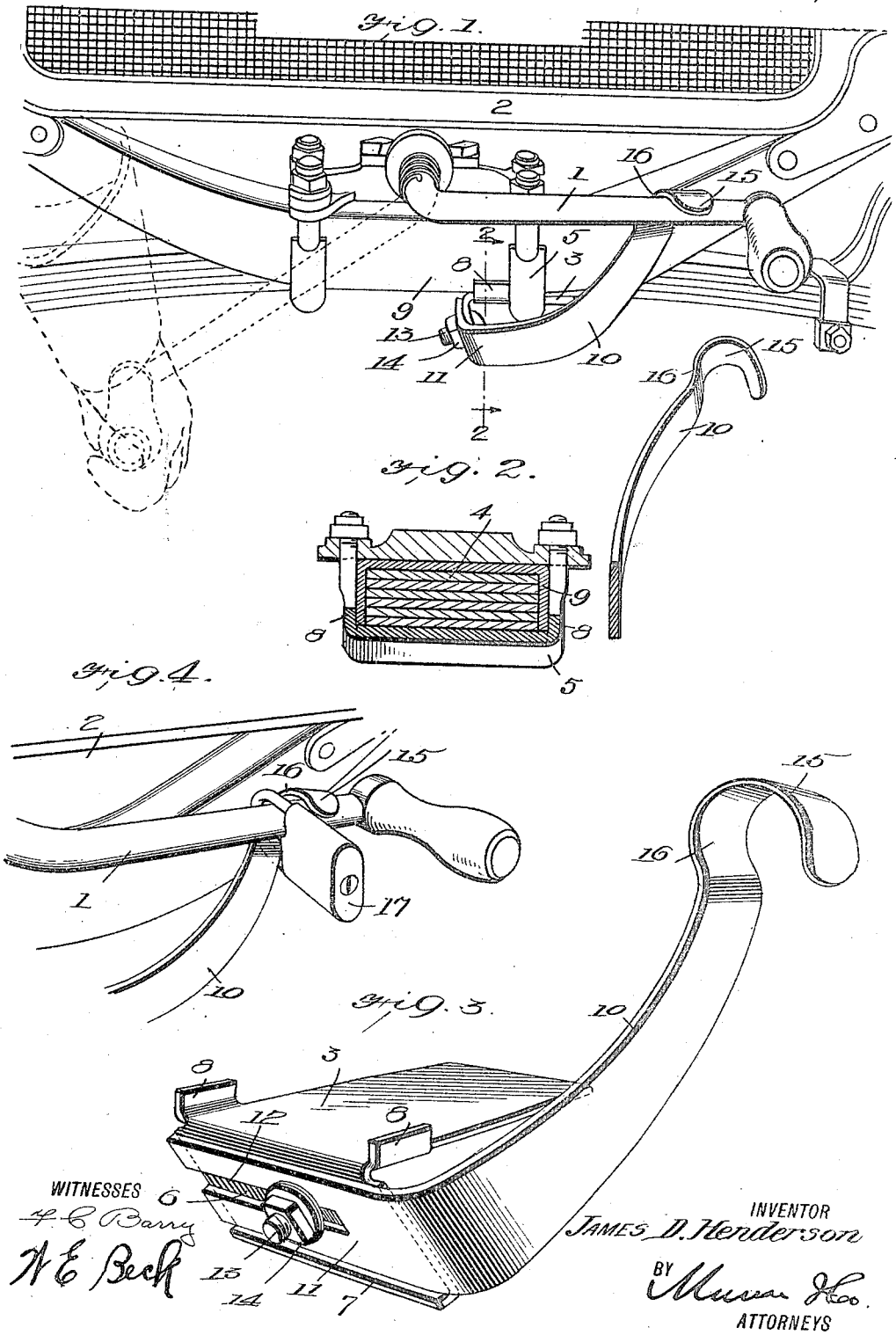

JAMES D. HENDERSON, OF MONMOUTH, ILLINOIS.

ATTACHMENT FOR MOTOR-VEHICLES.

1,229,956. Specification of Letters Patent. Patented June 12, 1917.

Application filed November 4, 1916. Serial No. 129,465.

*To all whom it may concern:*

Be it known that I, JAMES D. HENDERSON, a citizen of the United States, and a resident of Monmouth, in the county of Warren and State of Illinois, have invented an Improvement in Attachments for Motor-Vehicles, of which the following is a specification.

My invention is an improvement in attachments for motor vehicles, and has for its object to provide an attachment of the character specified, capable of attachment to a car for insuring the driver against injury from kicking back of the motor during the cranking of the car.

In the drawings:

Figure 1 is a partial front view of a car showing the attachment in use.

Fig. 2 is a section on the line 2—2 of Fig. 1, looking in the direction of the arrows adjacent to the line.

Fig. 3 is a perspective view of the attachment detached.

Fig. 4 is a similar view of a portion of the attachment showing the manner of applying a lock.

The present embodiment of the invention is shown in connection with the starting crank 1 of an automobile indicated at 2, and the attachment comprises a base or bracket plate consisting of a body portion 3 which is adapted to fit against the under side of the spring 4, and the said plate is held in place on the said spring by the clip 5 which connects the stem to the body. The plate is provided at one end with an angular portion 6, which is bent at an acute angle to the body of the bracket. At its free edge this angular portion has a flange 7 extending laterally in the opposite direction to the body.

At the junction of the angular portion with the body, the body is provided at each side edge with an upwardly extending flange 8, and these flanges engage on opposite sides of the element 9 to which the central portion of the spring is connected. Thus the base or bracket is held firmly to the vehicle, at one side of the axis of the crank 1.

A spring plate 10 is connected with the base or bracket, the said plate having an angular portion 11 extending transversely of the angular portion 6, and of a width corresponding to the width of the said portion, and adapted to rest at its lower side edge against the flange or rib 7. This angular arm 11 has a longitudinally extending slot 12, at the free end thereof, and the said slot is adapted to register with an opening through the angular portion 6 of the bracket, and a bolt 13 is passed through the registering slot and opening and is engaged by a nut 14 on the outer face of the portion 11 for securing the parts in adjusted position. It is obvious that by loosening the nut the spring plate 10 may be adjusted toward and from the body of the vehicle, to compensate for differences in position of the starting crank.

As shown more particularly in Fig. 2, the plate 10 curves upwardly and outwardly away from the vehicle, and is provided at its extremity with a hook 15 for engaging the crank, to limit the upward movement thereof should the engine kick back.

In practice the improved attachment may be connected to the motor vehicle, the base or bracket being first connected, after which the spring holder 10 is adjusted to proper position with respect to the crank. In use, during cranking, should the engine back fire, the crank will swing rearwardly and will strike the out-curved portion of the holder 10, which will by its resiliency and its resistance to inward pressure act as a brake. The hook 15 will eventually engage the crank in the manner shown in Fig. 1, stopping the crank and preventing injury to the driver through kicking back of the crank.

Not only does the improvement prevent injury from a kick back, but it reduces the force of a kick back to a minimum because with the attachment in place the operator can not spin the motor with the crank but must crank the car with quarter turns upward only, and when so cranked the back fire has the force of but one cylinder.

However, when it is necessary to spin the motor for any reason, as during cleaning, by loosening the nut 14 the spring holder may be removed, leaving the complete turning of the crank unimpeded. The spring holder 10 is so adjusted and tensioned, that in case of a kick back on a quarter turn, the crank is immediately disengaged from the motor shaft, by the outward pressure of the curved portion 10, and at the same time the momentum of the crank is braked, so that when the crank engages the hook it will be checked.

The hook 15 serves also as a carrier or holder for the crank when not in use, for it will be noticed that at the junction of the hook with the body of the holder a transverse groove or depression 16 is provided of sufficient depth to receive and hold the crank. The device also provides a means for locking the crank, merely by providing a pad lock indicated at 17, having a shackle which will embrace the crank and the holder.

I claim:

1. An attachment of the character specified, comprising a bracket for attachment to the body of a vehicle adjacent to the crank shaft, said bracket having a depending oblique portion, a spring holder having an angular portion extending transversely of the depending oblique portion and adjustably connected therewith, said holder curving upwardly, outwardly and forwardly to disengage the crank from the engine shaft and to brake the same and having a hook at its upper end for engagement by the cranking shaft to hold the same from movement in the reverse direction and to hold the same in inoperative position.

2. An attachment of the character specified comprising an arm having means for connecting the same to a motor vehicle adjacent to the crank, said arm having a cam surface for moving the crank shaft longitudinally away from the engine shaft and having a hook at the end of the cam surface, the cam surface being shaped to move the crank into the hook and merging smoothly into the hook.

JAMES D. HENDERSON.

Witnesses:
W. B. ZIMMER,
E. E. PÖLLARD.

Copies of this patent may be obtained for five cents each, by addressing the "Commissioner of Patents, Washington, D. C."